United States Patent [19]

Hill et al.

[11] Patent Number: 4,743,648
[45] Date of Patent: May 10, 1988

[54] NOVEL POLISH COMPOSITIONS

[75] Inventors: Michael P. L. Hill, Hoeilaart, Belgium; Luc J. R. Vandamme, Barry, Wales

[73] Assignee: Dow Corning, Ltd., Barry, Wales

[21] Appl. No.: 855,249

[22] Filed: Apr. 24, 1986

[30] Foreign Application Priority Data

May 17, 1985 [GB] United Kingdom ............... 8512483

[51] Int. Cl.$^4$ ........................... C09G 1/12; C09G 1/16
[52] U.S. Cl. ...................... 524/731; 524/801; 523/337; 106/11; 106/287.12; 106/287.13; 106/287.14; 106/10
[58] Field of Search ........................ 524/266, 801, 731; 106/287.11, 287.12, 287.13, 11

[56] References Cited

U.S. PATENT DOCUMENTS

| 2,584,413 | 2/1952 | Baer | 106/287.13 |
|---|---|---|---|
| 2,733,154 | 1/1956 | Taylor | 106/287.13 |
| 2,907,664 | 10/1959 | Schoenholz | 106/287.13 |
| 3,341,338 | 9/1967 | Pater | 106/287.13 |
| 3,576,779 | 4/1971 | Holdstock | 106/287.12 |
| 3,929,492 | 12/1975 | Chapman | 106/287.13 |
| 3,960,575 | 6/1976 | Martin | 106/11 |
| 4,273,584 | 6/1981 | D'Angelo | 106/287.11 |
| 4,592,934 | 6/1986 | Wolstoncroft | 106/11 |
| 4,809,981 | 4/1988 | Sanders | 106/287.13 |

FOREIGN PATENT DOCUMENTS

| 791605 | 3/1958 | United Kingdom . |
|---|---|---|
| 797263 | 6/1958 | United Kingdom . |
| 942587 | 11/1963 | United Kingdom . |
| 996657 | 6/1965 | United Kingdom . |
| 1102057 | 2/1968 | United Kingdom . |
| 1162772 | 8/1969 | United Kingdom . |
| 1237080 | 6/1971 | United Kingdom . |
| 1282471 | 7/1972 | United Kingdom . |
| 1313139 | 4/1973 | United Kingdom . |
| 1455199 | 11/1976 | United Kingdom . |

OTHER PUBLICATIONS

McCutcheon's Publications—Combined Edition 1975/Detergents & Emulsifiers/North American, pg. 240.

Primary Examiner—C. Warren Ivy
Attorney, Agent, or Firm—Robert L. McKellar

[57] ABSTRACT

Water-in-oil compositions having a continuous oil phase comprising a silicone and a hydrocarbon cleaning component, a discontinuous water phase, comprise as emulsifier an organopolysiloxane of the formula

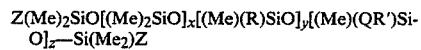

$Z(Me)_2SiO[(Me)_2SiO]_x[(Me)(R)SiO]_y[(Me)(QR')SiO]_z—Si(Me_2)Z$ where Me denotes methyl, Q a polyoxyalkylene radical, R a $C_6$–$C_{16}$ alkyl radical, R' an alkylene and Z a monovalent radical. The organopolysiloxane allows stability and easy emulsification of water into an oil phase comprising those silicones and hydrocarbons which are preferred in polishes.

7 Claims, No Drawings

NOVEL POLISH COMPOSITIONS

This invention relates to novel polish compositions of the water-in-oil emulsion type. The invention is particularly concerned with the use of certain organopolysiloxanes as emulsifiers for the water-in-oil polish. composition where the oil phase comprises a hydrocarbon component and a silicone component.

Polishes of the water-in-oil emulsion type have a water phase as the discontinuous phase and a continuous oil phase. Both phases can include several components such as abrasives, thickeners and stabilisers. Such compositions have been known for some years. Due to the fact that the oil phase is the continuous phase these polishes have certain characteristics such as better cleaning properties which make them preferred over the oil-in-water emulsion compositions for certain applications.

Polishes having silicone components in the oil phase have also been known for some time. The silicone component will provide gloss, ease of application and a hydrophobic finish. However, it is well established in the art of making polish compositions that the production of water-in-oil emulsion where the oil phase comprises a silicone component is not easy and becomes more difficult when the silicones are the preferred ones for gloss and detergent resistance. Such silicone components are generally high viscosity siloxane polymers or siloxanes having functional groups directly or indirectly linked to Si atoms. The number of emulsifying agents which can accomplish satisfactory emulsification of such components is rather limited.

In addition to the characeristics mentioned above, water-in-oil polish emulsions also have the advantage that they can be thickened to paste-like materials by the addition of water. The use of increased levels of water will cheapen the polish composition when this pasty consistency is desired. However, it is very difficult to obtain stable emulsions with a large proportion of water as the discontinuous phase and a small amount of oil comprising silicone components as the continuous phase.

U.K. Patent Specification No. 1 282 471 describes the use of aminoalkyl silicones, as well as dimethyl polysiloxanes, in emulsion type polish compositions. However, of the six examples given only one is a water-in-oil emulsion, using 5.5 parts of aminosiloxane polymers, 1 part of dimethylpolysiloxane, 35 parts of isoparaffins, 2 parts of a sorbitan monooleate emulsifier, 0.2 part of a polyoxyethylene sorbitan monooleate emulsifier and 50 parts of water (all parts are expressed by weight). All of the remaining examples relate to oil-in-water emulsion polish compositions.

U.K. Patent No. 1 102 057 relates to polish emulsion compositions using as levelling aid an organopolysiloxane-polyoxyalkylene block copolymer, wherein the polyoxyalkylene blocks account for 40 to 70 percent by weight of the block copolymer. The compositions exemplified in this patent specification are all oil-in-water type emulsions.

It is an object of the present invention to provide polish emulsion compositions which are stable on storage and which comprise an aqueous phase dispersed in an oil phase containing both silicone and hydrocarbon components.

Accordingly the present invention provides a polish composition in the form of a water-in-oil emulsion comprising (1) a discontinuous phase comprising water, (2) an organopolysiloxane having the formula

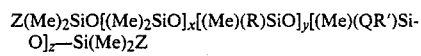

wherein Me denotes a $CH_3$ radical Q denotes a polyoxyalkylene radical having the formula

R an alkyl radical having from 6 to 16 carbon atoms,
R' denotes an alkylene radical linking Q to the silicon atom,
R" denotes a hydrogen atom or an alkyl radical having from 1 to 4 inclusive carbon atoms,
Z denotes a monovalent radical selected from the group consisting of hydrocarbon radicals having from 1 to 16 carbon atoms and QR'— radicals, there being an average of at least one QR'— radical and at least one R radical per molecule and the average values of x, y, z, p and q being such that $p>q$, $p+q$ has a value sufficient to provide a radical weight for Q of from 600 to 3500, $x<3y$, $x+y+z$ has a value of from 30 to 400 and the total weight of Q radicals in the organopolysiloxane does not exceed a value of about $\frac{1}{3}$ of the total weight of the organopolysiloxane and (3) a continuous phase comprising (a) a silicone component, (b) a hydrocarbon cleaning component with a boiling point between 80° and 250° C.

The discontinuous phase, comprising water, can comprise from about 30 to 85 percent by weight of the total weight of the composition, the preferred proportion being from 50 to 80 percent by weight of the total weight of the composition.

These organopolysiloxanes (2) of the composition of the present invention, are substantially linear polydiorganosiloxanes which are terminated with triorganosiloxy units having the formula $Z(CH_3)_2SiO_{\frac{1}{2}}$ wherein Z denotes a QR'—radical or a mcnovalent hydrocarbon radical having from 1 to 16 carbon atoms, e.g. methyl, ethyl, propyl, isopropyl, butyl, pentyl, trimethylpentyl, tetradecyl and vinyl. Each Z preferably denotes a methyl radical or a QR'— radical.

The organopolysiloxanes (2) must demonstrate a preference for, such as solubility or near-solubility in, an oil phase containing organopolysiloxanes, while at the same time be able to stabilize a dispersed aqueous phase. This requirement is satisfied if the following criteria apply.

In the above formula for the organopolysiloxanes the average values of x, y and z are such that the value of x is equal to or less than the value of 3 y, the sum of the values of x, y and z has a value of from 30 to 400 and R and Q radicals are always present. In order for the organopolysiloxane to be effective as an emulsifier for water-in-oil emulsions the organopolysiloxane should be composed of at least 2/3 by weight of an oleophilic portion, said oleophilic portion consisting of less than about 75 mol percent $(CH_3)_2SiO_{2/2}$ units and more than about 25 mol percent $(CH_3)(R)SiO_{2/2}$ units: excluding the terminal $Z(CH_3)_2SiO_{\frac{1}{2}}$ siloxy units and the Q-bonding $(CH_3)(—R')SiO_{2/2}$ siloxane units.

For example an organopolysiloxane having the formula, where Me represents a —$CH_3$ radical,

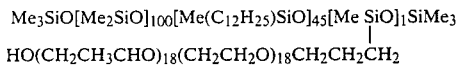

Me₃SiO[Me₂SiO]₁₀₀[Me(C₁₂H₂₅)SiO]₄₅[Me SiO]₁SiMe₃
                                                |
                     HO(CH₂CH₃CHO)₁₈(CH₂CH₂O)₁₈CH₂CH₂CH₂ has a total molecular weight of 19815 and the hydrophilic polyoxyalkylene portion (Q) of the organopolysiloxane has a weight of 1855 or 9.4 percent by weight. The oleophilic portion of the organopolysiloxane has a weight of 17960 and is 69 mol percent dimethylsiloxane units and 31 mol percent methyldodecylsiloxane units, neglecting trimethylsiloxy end groups and the (CH₃)(—CH₂CH₂CH₂)SiO₂/₂ siloxane unit.

Within the limits for the value of x, y and z, noted above, x preferably has a value of from 0 to 100. Most preferred are organopolysiloxanes wherein x has a value of zero. Such organopolysiloxanes are preferred because of their superior efficacy as emulsifiers in the compositions of this invention.

Within the limits for x, y and z noted above, including the preferred limits for x, the sum of y+z preferably has a value of from about 30 to about 70. One reason for limiting the value of y+z as stated is to facilitate its preparation. Another reason is to provide an organopolysiloxane which is sufficiently surface active and has a low enough molecular weight to be easily soluble in the oil phase comprising a silicone component.

Preferably z has a value of from about 1 to about 3 and most preferably no more than about 2.

It is to be noted that the values of x, y and z are average values, their various actual values being determined by the random process by which each individual organopolysiloxane molecule is prepared.

The organopolysiloxanes (2) of the composition of the present invention, contain at least one siloxane unit having the formula (CH )(R)SiO₂/₂ or R(CH₃)₂SiO₁ wherein R denotes an alkyl radical having from 6 to 16 carbon atoms. Examples of operative R radicals include normal alkyl radicals such as hexyl, heptyl, octyl, nonyl, decyl, dodecyl, tetradecyl and hexadecyl and branched alkyl radicals such as isooctyl, secondary octyl, 2-ethylhexyl, secondary dodecyl and isododecyl. Where there are more than one R radical present in organopolysiloxanes (2) they may be the same or different.

R is preferably the dodecyl radical because the corresponding organopolysiloxanes (2) possess a plurality of favourable properties, including ease of synthesis (relatively non-volatile olefins are used), good solubility in the oil phase and desirable handling viscosity (they are liquids, not waxes). However, although dodecyl radicals are preferred as the R radicals, the radicals having from 10 to 14 carbon atoms, both inclusive, provide one or more of the favourable properties noted above and the preferred choice of R may depend on the consideration of other factors such as the purity, cost and/or availability of the corresponding olefin precursor.

The organopolysiloxanes (2) employed according to the present invention contain at least one siloxane unit having the formula (CH₃)(QR')SiO₂/₂ or (QR')(CH₃)₂SiO₁, wherein Q denotes a polyoxyalkylene radical and R' denotes an alkylene radical linking Q to the Si atom. In the QR'—radical, Q denotes a hydrophilic radical having the formula —(OCH₂CH₂)-$_p$(OCHCH₃CH₂)$_q$OR" wherein R" denotes a hydrolytically stable terminating radical, such as the hydrogen atom or a lower alkyl radical, such as methyl, ethyl, isopropyl or butyl, or an acyl group such as acetyl.

Preferably R" denotes the hydrogen atom to further enhance the hydrophilic nature of the Q radical. In the general formula for Q, p and q have values such that the number of oxyethylene units (OCH₂CH₂) is, on average, equal to or greater than the number of oxypropylene units (OCHCH₃CH₂) therein, and the weight of the Q radical (radical weight) has a value of from about 600 to about 3500. Examples of typical values of p and q include, but are not limited to, p=15, q=0; p=15, q=15; p=18, q=18; p=25; q=25; and p=29, q=7. It is to be noted that the values of p and a are average values, the actual values of p and q having various values which are determined by the random process by which each individual polyoxyalkylene radical precursor is prepared.

In the QR'—radical R' is preferably the propylene radical because the preferred precursor allyl-initiated polyoxyalkylenes are most readily prepared. However, the identity of R' is not critical and it may be any alkylene radical such as methylene, ethylene, propylene, butylene or higher alkylene.

A highly preferred QR'—radical has the formula

—CH₂CH₂CH₂(OCHCH₃CH₂)$_p$(OCHCH₃CH₂-
)$_q$OH wherein the values of p and q are as delineated above and preferably, where the values of p and q are as exemplified above.

The organopolysiloxanes (2) of the composition of this invention may be prepared by any suitable method. A preferred method comprises the hydrosilylation reaction of an olefin and an olefinically substituted polyoxyalkylene with a suitable polymethylhydrogensiloxane in the presence of a noble metal catalyst, in the well known manner. Examples of suitable polymethylhydrogensiloxanes include HMe₂SiO(MeHSiO)$_{y+z}$-SiMe₂H, Me₃SiO(MeHSiO)$_{y+z}$SiMe₃, Me₃SiO(Me₂SiO)$_x$(MeHSiO)$_{y+z}$SiMe₃ and HMe₂SiO(Me₂SiO)$_x$ 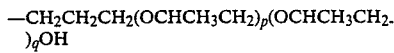 wherein Me denotes the methyl radical. Preferably, the olefin is allowed to react with the polymethylhydrogensiloxane first, followed by the olefinically substituted polyoxyalkylene. For example, dodecene may be reacted with Me₃SiO(MeHSiO)₃₀ to 70 SiMe₃ to form an alkylated siloxane, followed by a reaction of CH₂=CHCH₂(OCH₂CH₂)$_p$(OCHCH₃CH₂)$_q$OH with the alkylated siloxane in the presence of a suitable solvent such as isopropanol. When the organopolysiloxane is to contain from 1 to 3 QR'—radicals, it is preferred that from 80 to 95 percent of the stoichiometric amount of olefin be reacted with the polymethylhydrogensiloxane to provide a partially alkylated polymethylhydrogensiloxane and the balance of the olefin or an excess thereof, be reacted after the olefinically substituted polyoxyalkylene has been reacted with the thus partially alkylated polymethylhydrogensiloxane.

The organopolysiloxanes (2) of the composition of this invention may further comprise trace amounts of silicon-bonded radicals which occur as impurities in, or arise during the preparation of, commercial organopolysiloxanes. Examples of such silicon-bonded radicals include hydrogen atoms, hydroxyl radicals and alkoxy radicals. The organopolysiloxanes may also comprise up to about 10 percent by weight of unreacted starting materials, and their associated impurities, that are used in the preparation thereof. Examples of such unreacted starting materials and their associated impurities include hydrocarbons, such as alkanes and alkenes; polyoxyalkylenes, such as polyoxyalkylene glycols and olefinically substituted polyoxyalkylenes: solvents such as isopropanol, higher aliphatic alcohols and toluene: and unreacted siloxanes, such as polydimethylsiloxanes, cyclopolydimethylsiloxanes and hexamethyldisiloxane.

The organosiloxane (2) may be used in amounts ranging from 0.2 to 10 percent by weight of the total weight of the composition: preferably 0.2 to 2.5 percent is used.

The continuous phase (3) of the composition of the present invention comprises (a) a silicone component and (b) a hydrocarbon cleaning component having a boiling point between 80° and 250° C. The nature of the silicone component (a) is not critical and it may comprise any of those suitable as ingredients of polish compositions. Such silicones are generally linear or substantially linear polydiorganosiloxanes wherein at least 50 percent of the organic substituents are methyl radicals any remaining silicon-bonded substituents being selected from monovalent hydrocarbon radicals e.g. propyl, tetradecyl, vinyl or phenyl or monovalent substituted hydrocarbon radicals e.g. trifluoroalkyl, epoxyalkyl, aminoalkyl or aminoalkyl salt radicals. In addition to the aforementioned radicals the polydiorganosiloxanes may also contain small proportions of other silicon-bonded substituents, for example hydroxyl radicals, alkoxy radicals, alkoxyalkoxy radicals and hydrogen atoms. The preferred linear polydiorganosiloxanes can be represented by the general formula

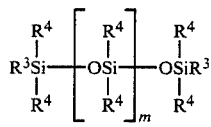

wherein the $R^3$ and $R^4$ groups are selected from methyl radicals, alkyl radicals having substituted therein one or more amino and/or amine salt groups, alkoxy radicals, alkoxyalkoxy radicals and hydroxyl radicals, at least 50 percent of the total substituents being methyl radicals, and m has a value of from 20 to 2000.

Examples of the silicones 3(a) which may be employed according to the invention are polydimethylsiloxanes, copolymers of dimethylsiloxane units and methylvinylsiloxane units and copolymers of dimethylsiloxane units and methyl(aminoalkyl)siloxane units. The polydiorganosiloxanes may be chain terminated with hydroxy radicals, alkoxy radicals or triorganosiloxy units wherein the organic groups are, for example, one or more of methyl, vinyl, phenyl and aminoalkyl.

Suitable silicones 3(a) and their use in polish formulations are described for example in British Patent Nos. 791 605, 797 263, 996 657, 1 162 772, 1 237 080, 1 237 080, 1 313 139 and 1 455 199. The silicone component (a) in the oil phase (3) of the composition of the present invention may comprise one or more different silicones. The silicone component of the oil phase may comprise from 1 to 15 percent by weight of the total weight of the polish composition.

The hydrocarbon cleaning component (b) of the oil phase (3) of the composition of the present invention is a hydrocarbon, preferably aliphatic, having a boiling point within the range from 80° to 250° C. This component is intended to function as a cleaning agent when the polish composition is applied to a substrate and also to act as solvent in the oil phase. Suitable hydrocarbons include for example coal tar naphtha, cyclohexane, gasoline, isoparaffins, naptha and mineral spirits, or mixtures thereof. These cleaning materials may be used in amounts from 0.5 to 40 percent by weight of the total composition. Preferably 10 to 30 percent is used. In addition to the four essential ingredients of the polish composition of this invention other ingredients may be present, for example, silicon-free surfactants, abrasives, thickeners, waxes, stabilising agents and perfumes.

Among the waxes that may be used in this invention are paraffins, microcrystalline waxes, polyolefins, such as polyethylene and oxidised polyolefins, such as oxidised polyethylene, carnauba, beeswax, hydrogenated castor oil, ouricury, petrolatum and mixtures thereof. Abrasives which may be employed in the composition are those conventional abrasives, employed in polish compositions, with the most common of such being diatomaceous earth, aluminium silicate and aluminium oxide.

It is sometimes advantageous to incorporate thickeners in a polish composition for example to modify the consistency of the polish, or to insure that any insoluble materials in the polish remain in suspension. Suitable thickeners include natural gums, carboxymethyl cellulose, polyvinyl alcohol or carboxyvinyl polymers, such as those sold under the trade name Carbopol ®.

Although not required the emulsion compositions of this invention may further contain one or more silicon-free surfactants which have an H.L.B. rating of up to 10. Examples of suitable silicon-free surfactants can be found in well known publications such as McCutcheon's "*Detergents and Emulsifiers*", Allured Publishing Company, Ridgewood, New Jersey, U.S.A., which discloses surfactants having an H.L.B. value of up to 10. Stabilising agents such as freeze-thaw stabilising agents may also be added to the composition. Such stabilisers are e.g. sodium citrate or ethylene glycol. Other additives such as wetting agents and acids to control the pH in order to stop bacterial growth may also be used.

The form of the compositions of this invention may range from freely flowing lotions to stiff creams to solidified gels, the exact form being largely, but not exclusively, determined by the ratio of aqueous phase to oil phase present therein in the well known manner.

The emulsion compositions of this invention may be prepared in any suitable manner. In a process for preparing these compositions organopolysiloxane (2) is used as emulsifier. In the presence of said organopolysiloxane (2) a previously prepared aqueous phase may be mixed with a previously prepared oil phase according to known techniques. Preferably sufficient agitation and/or shear is applied to disperse the aqueous phase as droplets having a diameter of preferably less than 10 micrometers, most preferably less than 1 micrometer. Mild heating may be used, if desired, to aid in the mixing. In a process for preparing the polish compositions of the invention a previously prepared oil phase may be added to a water phase in the presence of organopolysiloxane (2). In this process initially an oil-in-water emulsion may be formed, which will invert upon the mixing in of more of the oil phase, to form an emulsion composition according to the invention. Alternatively a previously prepared water phase may be added to the previously prepared oil phase in the presence of the organopolysiloxane (2), in which case water-in-oil emulsion will be formed immediately.

When waxes are used, heating of the oil phase in order to melt the wax is necessary before the water phase is added.

Compositions according to this invention have a good emulsion stability of at least several weeks. Waxless polish compositions may be processed at room temperature with a minimum of homogenisation. The polish can easily be applied and rubs out well yielding a good glass and other benefits associated with the silicones. The aminosiloxanes will e.g. improve the detergent resistance and the durability of the applied polish film.

The following examples illustrate the invention. All parts and percentages are expressed by weight and Me stands for a methyl radical.

EXAMPLE 1

A polydiorganosiloxane-oxyalkylene copolymer of the average formulation

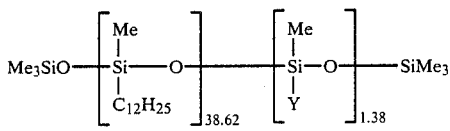

where Y represents $(CH_2)_3-(OCH_2H_4)_{15}-(OC_3H_6)_{15}-OH$ was prepared by reacting a methyl hydrogen polysiloxane having trimethylsilyl end groups, first with dodecene and then with an allyl polyglycol in the presenc of a Pt catalyst. A polish formulation in emulsion form was prepared consisting of (1) 5.7 parts of a mixture of 10% $MeSi(OMe)_3$ and 90% of a polydimethylsiloxane having silicon-bonded methoxy groups and silicon-bonded groups of the formula $-(CH_2)_3NH(CH_2)_2NH_2$ and an average viscosity of 4.5 $10^{-5}$ m$^2$/s, the said polydimethylsiloxane having been prepared according to the process described in G.B. patent No. 42 587; (2) 1 part of a 50% solution in hydrocarbon solvent and isopropylalcohol of a polydimethylsiloxane having silicon-bonded methoxy groups and silicon-bonded groups of the formula $-(CH_2)_3NH(CH_2)_2NH_2$ and an average viscosity of 3 $10^{-4}$ m$^2$/s; the said polydimethylsiloxane having been prepared according to the process described in G.B. patent No. 942 587; (3) 19 parts of a hydrocarbon solvent, commonly known as white spirit; (4) 2 parts of the polydiorganosiloxane-oxyalkylene copolymer described above; (5) 1 part of a nonionic emulsifier having an alkyl group of 11–15 carbon atoms and 3 moles of oxyethylene, which is sold under the trade name Tergitol ® 15S3; (6) 9.5 parts of a kaolin clay abrasive; (7) 59.8 parts of water and (8) 2 parts of a 50% solution of sodium citrate in water. The emulsion is prepared by blending (1), (2), (3), (4) and (5) and slowly adding to this blend a dispersion of (6) in (7). This forms a water-in-oil emulsion to which (8) is added.

A stable emulsion was obtained which gave a good gloss and easy application and rub out.

EXAMPLE 2

A liquid polish formulation, in emulsion form, consists of (1) 2 parts of a mixture of 10% $MeSi(OMe)_3$ and 90% of a polydimethylsiloxane having silicon-bonded methoxy groups and silicon-bonded groups of the formula $-(CH_2)_3NH(CH_2)_2NH_2$ and an average viscosity of 4.5 $10^{-5}$ m$^2$/s, the said polydimethylsiloxane having been prepared according to the process described in G.B. patent No. 942 587: (2) 2 parts of substantially linear polydimethylsiloxane having trimethylsilyl end groups, and having a viscosity of 12.5 Pa.s; (3) 23 parts of White Spirit: (4) 2 parts of the polydiorganosiloxaneoxyalkylene copolymer from Example 1; (5) 1 part of Tergitol ® 15S3; (6) 68 parts of water and (7) 2 parts of a 50% solution of sodium citrate in water.

The water-in-oil emulsion was prepared by blending (1), (2), (3), (4) and (5) and adding slowly under stirring (6). (7) is added to the finished emulsion. Some separation occurred after prolonged storage but this could easily be remixed.

EXAMPLE 3

A thick, but pourable polish emulsion was prepared consisting of (1) 3 parts of a 50% solution in hydrocarbon solvent and isopropanol of a polydimethylsiloxane having silicon-bonded methoxy groups and silicon-bonded groups of the formula $-(CH_2)_3NH(CH_2)_2NH_2$ and an average viscosity of 3 $10^{-4}$ m$^2$/s, the said polydimethylsiloxane having been prepared according to the process described in G.B. patent No. 942 587; (2) 1 part of a mixture of 10% $MeSi(OMe)_3$ and 90% of a polydimethylsiloxane having silicon-bonded methoxy groups and silicon-bonded groups of the formula $-(CH_2)_3NH(CH_2)_2NH_2$ and an average viscosity of 4.5 $10^{-5}$ m$^2$/s, the said polydimethylsiloxane having been prepared according to the process described in G.B. patent No. 942 587; (3) 15 parts of white spirit; (4) 2 parts of the poldiorganosiloxane-oxyalkylene copolymer of Example 1; (5) 10 parts of a kaolin clay abrasive; (6) 1 part of Tergitol ® 15S3; (7) 66 parts of water and (8) 2 parts of a 50% sodium citrate solution in water.

The emulsion is prepared by blending (1), (2), (3), (4) and (6) and slowly adding to this blend a dispersion of (5) in (7). (8) is added to the final water-in-oil emulsion.

EXAMPLE 4

A soft paste automobile polish was prepared, consisting of (1) 2 parts of a 50% solution in a hydrocarbon solvent and isopropanol, of a polydimethylsiloxane having silicon-bonded methoxy groups and silicon-bonded groups of the formula $-(CH_2)_3NH(CH_2)_2NH_2$ and an average viscosity of 3 $10^{-4}$ m$^2$/s, the said polydimethylsiloxane having been prepared according to the process described in G.B. patent No. 942 587; (2) 0.6 part of a mixture of 10% $MeSi(OMe)_3$ and 90% of a polydimethylsiloxane having silicon-bonded methoxy groups and silicon-bonded groups of the formula $-(CH_2)_3NH(CH_2)_2NH_2$ and an average viscosity of 4.5 $10^{-5}$ m$^2$/s, the said polydimethylsiloxane having been prepared according to the process described in G.B. patent No. 942 587; (3) 16 parts of white spirit; (4) 2 parts of the polydiorganosiloxane-oxyalkylene block copolymer of Example 1; (5) 10 parts of a kaolin clay abrasive; (6) 1 part of Tergitol ® 15S3; (7) 63.5 parts of water; (8) 1.5 parts of carnauba wax; (9) 1.5 parts of paraffin wax and (10) 2 parts of a 50% solution of sodium citrate in water.

The water-in-oil emulsion is prepared by mixing and heating (3), (8) and (9) to a temperature of 85°–90° C. until the wax is properly dispersed and then adding (1), (2) and (4). A dispersion of (5) in (7) is then slowly added to this blend under stirring and (10) is added to the final water-in-oil emulsion.

EXAMPLES 5 and 6

A polydiorganosiloxane-oxyalkylene copolymer of the average formula

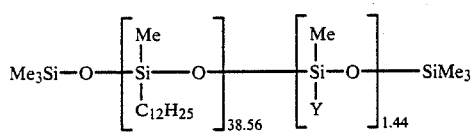

where Y represents —(CH$_2$)$_3$)—(OC$_2$H$_4$)$_{18}$—(OC$_3$H$_6$)$_{18}$—OH was prepared by reacting a methylhydrogen polysiloxane having trimethylsilyl end groups, with dodecene, isostearyl alcohol and allyl polyglycol in the presence of a Pt catalyst.

Polish formulations were prepared consisting of (1) a 50% solution in hydrocarbon solvent and isopropanol of a polydimethylsiloxane having silicon-bonded methoxy groups and silicon-bonded groups of the formula —(CH$_2$)$_3$NH(CH$_2$)$_2$NH$_2$ and an average viscosity of 3 10$^{-4}$ m$^2$/s, the said polydimethylsiloxane having been prepared according to the process described in G.B. patent No. 942 587; (2) a mixture of 10% MeSi(OMe)$_3$ and 90% of a polydimethylsiloxane having silicon-bonded methoxy groups and silicon-bonded groups of the formula —(CH$_2$)$_3$NH(CH$_2$)$_2$NH$_2$ and an average viscosity of 4.5 10$^{-5}$ m$^2$/s, the said polydimethylsiloxane having been prepared according to the process described in G.B. patent No. 942 587; (3) the above-described polydiorganosiloxanexyalkylene copolymer: (4) white spirit; (5) a kaolin clay abrasive; (6) Tergitol ® 15S3; (7) water and (8) a 50% solution of sodium citrate in water according to the following formulations, in parts by weight:

| Ingredients | Example 5 | Example 6 |
| --- | --- | --- |
| (1) | 3 | 3 |
| (2) | 1 | 1 |
| (3) | 2 | 8 |
| (4) | 15 | 15 |
| (5) | 10 | 10 |
| (6) | 0 | 0 |
| (7) | 67 | 61 |
| (8) | 2 | 2 |

The polish emulsions were prepared by blending (1), (2), (3), (4) and (6) and mixing a dispersion of (5) in (7) slowly in the blend under stirring. (8) is added to the finished water-in-oil emulsions.

The emulsions were stable.

That which is claimed is:

1. A polish composition in the form of a water-in-oil emulstion comprising (1) 30 to 85 percent by weight of a discontinuous phase comprising water, (2) 0.2 to 10 percent by weight of a polydiorganosiloxane-polyoxyalkylene copolymer having the formula —Z(Me)$_2$SiO{(Me)$_2$SiO}$_x${(Me)(R)SiO}$_y${(Me)(QR')SiO}$_z$Si(Me)$_2$Z—

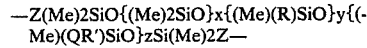

wherein Me denotes a CH$_3$— radical, Q denotes a polyoxyalkylene radical having the formula —(OCH$_2$CH$_2$)$_p$(OCHCH$_3$CH$_2$)$_q$OR", R denotes an alkyl radical having from 6 to 16 carbon atoms, R' denotes an alkylene radical linking Q to the silicon atom, R" is selected from a hydrogen atom and an alkyl radical having from 1 to 4 inclusive carbon atoms, Z denotes a monovalent radical selected from the group consisting of hydrocarbon radicals having from 1 to 16 carbon atoms and QR'—radicals, there being an average of at least one QR'—radical and at least one R radical per molecule and the average values of x, y, z, p and q being such that p≧q, p+q has a value sufficient to provide a radical weight for Q of from 600 to 3500, x<3y, x+y+z has a value of from 30 to 400 and the total weight of Q radicals in the polydiorganosiloxane-polyoxyalkylene copolymer does not exceed a value of about ⅓ of the total weight of the polydiorganosiloxane-polyoxyalkylene cpolymer and (3), a continuous phase comprising (a) 1 to 15 percent by weight of a silicone component, which is a substantially linear polydiorganosiloxane represented by the formula

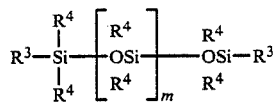

wherein R3 and R4 groups are selected from methyl radicals, alkoxy radicals, alkoxyalkoxy radicals, hydroxy radicals and alkyl radicals, having as substituents attached thereto, at least one group selected from amino and amine salt groups, at least 50% of the total number of the groups being methyl radicals, and m has a value of from 20 to 2000, and (b) 0.5 to 40 parts by weight of a hydrocarbon component with a boiling point between 80° and 250° C., the weight percents being based on the total composition.

2. A polish composition according to claim 1 wherein in the diorganopolysiloxane-polyoxyalkylene copolymer (2), Z denotes methyl or QR'.

3. A polish composition according to claim 1 wherein in the diorganopolysiloxane-polyoxyalklene compolymer (2), x has a value of Q, y+z has a value of from 30 to about 70 and z has a value of 1 or 2.

4. A polish composition according to claim 3 wherein in the diorganopolysiloxane-polyoxyalkylene copolymer (2), R denotes an alkyl radical having 12 carbon atoms.

5. A polish composition according to claim 4 wherein in the diorganopolysiloxane-polyoxyalkylene copolymer (2), R' denotes propylene and R" denotes H.

6. A polish composition according to claim 1 wherein component (3)(b) is an aliphatic hydrocarbon.

7. A polish composition according to claim 1 wherein the discontinuous phase (1) comprises from 50 to 80% by weight, diorganopolysiloxane-polyoxyalkylene copolymer (2) from 0.2 to 2.5% by weight and hydrocarbon cleaning component (3)(b) from 10 to 30% by weight of the total weight of the composition.

* * * * *